Patented May 10, 1938

2,116,602

UNITED STATES PATENT OFFICE 2,116,602

COLORING MATTERS OF THE PHTHALO-CYANINE TYPE

Isidor Morris Heilbron, Manchester, Francis Irving, Grangemouth, and Reginald Patrick Linstead, London, England, assignors to Imperial Chemical Industries Limited, a corporation of Great Britain No Drawing. Application November 15, 1933, Serial No. 698,216. In Great Britain November 16, 1932

9 Claims. (Cl. 260—46)

This invention relates to the manufacture of coloring matters of the phthalocyanine series. It is an object of this invention to provide an improved process for the manufacture of coloring matters of this series, especially those which do not contain combined metal. Other and further important objects of this invention will appear as the description proceeds.

In British patent specification No. 322,169 there is described a process for the production of blue to green coloring matters by heating phthalic anhydride with ammonia and certain metals or metal compounds including iron, cuprous chloride and nickel sulphide. In British patent specification No. 389,842, (corresponding to U. S. Patent No. 2,000,051) there is described a process for the production of nitrogen-containing coloring matters of complex constitution which comprises heating an o-cyanoarylcarboxyamide in the presence of specified metals and metal compounds. These coloring matters are described as purple to green in color and stated to appear to belong to one general class, this class appearing to include the said coloring matters of British patent specification No. 322,169. British patent specification No. 389,842 also describes the production of metal-free coloring matters and gives probable formulae for a coloring matter containing magnesium and the corresponding metal-free coloring matter.

British patent specification No. 390,149, (corresponding to U. S. Patent No. 2,000,052) describes the production of the same coloring matter containing magnesium and the corresponding metal-free coloring matter and of substituted derivatives of these by heating a phthalimide with ammonia and magnesium or antimony.

As described in the last mentioned patent, the metal-free compound may be produced either directly by heating a phthalimide with antimony, or indirectly, that is by first heating the phthalimide with magnesium to produce a magnesium containing compound, and then eliminating the magnesium by recrystallization from concentrated sulfuric acid.

We have now found that coloring matters of the same general series, which contain no combined metal or from which the metal can be readily removed by recrystallization from concentrated sulfuric acid, can be obtained by a simple treatment of o-arylene dicyanides. For instance, a blue-green coloring matter is obtained by heating phthalonitrile purified by being twice recrystallized from ethyl alcohol to about 350°. This coloring matter is obtained more readily if the phthalonitrile has not been recrystallized or if heating is effected in the presence of a second substance, for instance in ammonia. Coloring matters are also obtained if heating is done in the presence of an alkali or alkaline-earth metal or of an alkali-reacting, mildly reducing compound thereof or in the presence of an organic base. We have also found that substituted phthalonitriles and o-dinitriles of naphthalene and anthracene may be used instead of phthalonitrile. The so-obtained coloring matters are typically blue to green in shade, have only slight solubility in organic solvents, but dissolve in concentrated sulphuric acid and are decomposed by nitric acid. They contain nitrogen, are of complex constitution and where a metal or metal compound of the above series has been used in their manufacture, they may consist in part of a compound containing said metal in combined form.

However, provided the metal employed is one of the alkaline or alkaline-earth series, it may be readily eliminated by recrystallizing the coloring matter from concentrated sulfuric acid.

Of the compounds of the metals mentioned we prefer those which still have an alkaline reaction, for instance the alcoholates. Alternatively, one may use the free metal in conjunction with an alcohol. It will be noted that the reagents which we found of particular assistance have the one property in common of being alkali-reacting substances, but not of a degree to be caustic.

The coloring matters obtained by our new process therefore appear substantially identical with the coloring matter obtained from phthalimide and magnesium, followed by recrystallization from sulfuric acid, as more fully described and claimed in U. S. Patent No. 2,000,052. In general therefore our invention is that of a new process which comprises chemically combining molecules of an o-arylene dicyanide to give coloring matters containing nitrogen and of complex constitution.

Combination is preferably effected by submitting the o-arylene dicyanide to the action of heat preferably with the addition of a metal or metal compound of the above mentioned series or ammonia, or an organic base. Particularly valuable embodiments of this process are the manufacture of coloring matters by heating phthalonitrile with alkali metal alkoxides, particularly with sodium amyloxide in amyl alcohol.

Working according to this new process the coloring matters are generally speaking formed with greater readiness than according to those of the above-mentioned specifications and higher yields, in some cases nearly the theoretical, are obtained. Purification may be effected as already described in the said specifications.

The coloring matters may be employed as pigments. For instance they may be made into lakes with the usual substrata. Such lakes may be used as coloring matters for varnishes and inks.

The following examples in which parts are by weight illustrate but do not limit the invention.

Example 1

Pure phthalonitrile (twice recrystallized from ethyl alcohol) is heated at 350–360° C. in a sealed vessel for 7 hours. After cooling, the contents of the vessel are finely ground, extracted with boiling acetone, and purified from sulphuric acid. A pigment which appears to be metal-free compound is obtained.

Example 2

1.15 parts of sodium are dissolved in 32 parts of boiling amyl alcohol and 6.4 parts of phthalonitrile added. A yellow color immediately appears and is quickly replaced by a deep green, and a lustrous purple mass begins to separate. Boiling is allowed to proceed for about half an hour in all and the bulk of the amyl alcohol then distilled off. The residue is then extracted twice or more with boiling spirit to dissolve impurities. An excellent yield of what appears to be a mixture of metal-free phthalocyanine and a phthalocyanine containing sodium is obtained.

Example 3

One part of sodium is dissolved in 40 parts of cyclohexanol; 2 parts of phthalonitrile are added, and the mixture is boiled for about 15 minutes. The solution quickly turns green and deposits a precipitate which has a purple reflex. This precipitate is filtered off, extracted twice of more with boiling spirit; the residue after extraction is dissolved in concentrated sulphuric acid and the solution is then drowned in water. The metal-free phthalocyanine is obtained.

Example 4

5 parts of metallic potassium are dissolved in 240 parts of amyl alcohol, and 100 parts of phthalonitrile are added to the solution cold. The mixture is then heated for a few minutes. The melt is allowed to cool, diluted with alcohol; the insoluble matter is filtered off and washed with dilute acid, hot water and alcohol, dried and finally given a purification by recrystallization from concentrated sulphuric acid. The metal-free phthalocyanine is obtained.

Example 5

5 parts of calcium turnings, 240 parts of amyl alcohol and 100 parts of phthalonitrile are mixed and refluxed for 5 hours. The coloring matter is isolated as in the preceding example and recrystallized from concentrated sulphuric acid.

Example 6

A solution of 2 parts of phthalonitrile in 5.5 parts of quinoline is heated to 250° C., and then a steady stream of ammonia gas is passed into the solution for three hours or longer, the temperature being kept at about 250° C. The mixture is then filtered hot, and the residue is washed or extracted with alcohol and acetone until free from colorless material. A residue of glistening purple needles remains, which on powdering breaks down to a pure blue. This appears to be the metal-free coloring matter.

Example 7

A solution of 2 parts of phthalonitrile in 9.6 parts of dimethylaniline is heated at or just below 250° C. for five hours, while a stream of ammonia gas is passed in. After cooling, the pigment is filtered off, and extracted with an organic solvent to remove soluble impurities. The product appears to be the same as that of Example 6.

Example 8

Phthalonitrile is heated in an atmosphere of ammonia for several hours at a temperature of 260° C. A blue pigment is obtained together with a pale yellow substance, rather sparingly soluble in glacial acetic acid. (M. P. 308–309° C.)

Phthalonitrile may be prepared by the process of co-pending application Serial No. 706,150, resulting in U. S. Patent No. 2,054,088, issued September 15, 1936.

We claim:

1. Process for the manufacture of metal-free phthalocyanine coloring matters which comprises subjecting an o-arylene dicyanide to the action of heat in the presence of a reagent chosen from the group consisting of alkali-forming metals, their mildly reducing, alkaline-reacting compounds, ammonia, and tertiary organic bases.

2. Process for the manufacture of metal-free phthalocyanine coloring matters which comprises subjecting phthalonitrile to the action of heat in the presence of a reagent chosen from the group consisting of alkali-forming metals, their mildly reducing, alkaline-reacting compounds, ammonia, and tertiary organic bases.

3. Process for the manufacture of phthalocyanine coloring matters which comprises subjecting phthalonitrile to the action of heat in the presence of an alcoholate of an alkali-forming metal.

4. Process for the manufacture of phthalocyanine coloring matters which comprises subjecting phthalonitrile to the action of heat in the presence of an alkali metal alkoxide.

5. Process for the manufacture of phthalocyanine coloring matters which comprises subjecting phthalonitrile to the action of heat in the presence of an alkali metal alkoxide and the alcohol corresponding with the alkoxide.

6. Process for the manufacture of phthalocyanine coloring matters which comprises subjecting phthalonitrile to the action of heat in the presence of sodium amyloxide and amyl alcohol.

7. Process for the manufacture of phthalocyanine coloring matters which comprises subjecting an o-arylene dicyanide to the action of heat under mildly alkaline conditions, but in the absence of a metal or metal compound other than those of the alkali-forming groups, followed by a purification of the product by dissolution in sulphuric acid and subsequent dilution.

8. Process for the manufacture of metal-free phthalocyanine coloring matters which comprises subjecting an o-arylene dicyanide to the action of heat in the presence of a reagent chosen from the group consisting of alkali-forming metals, their mildly reducing, alkaline-reacting compounds, ammonia, and tertiary organic bases, followed by a purification of the product by dissolution in sulphuric acid and subsequent dilution.

9. Process for the manufacture of metal-free phthalocyanine coloring matters which comprises subjecting phthalonitrile to the action of heat in the presence of a reagent chosen from the group consisting of alkali-forming metals, their mildly reducing, alkaline-reacting compounds, ammonia, and tertiary organic bases, followed by a purification of the product by dissolution in sulphuric acid and subsequent dilution.

ISIDOR MORRIS HEILBRON.
FRANCIS IRVING.
REGINALD PATRICK LINSTEAD.